May 24, 1960 W. L. MORRISON 2,937,967
METHOD OF ASSEMBLING AN INSULATING LINING IN
IRREGULAR GENERALLY CYLINDRICAL METAL TANKS
Filed Aug. 12, 1953

Inventor,
WILLARD L. MORRISON

United States Patent Office 2,937,967
Patented May 24, 1960

2,937,967

METHOD OF ASSEMBLING AN INSULATING LINING IN IRREGULAR GENERALLY CYLINDRICAL METAL TANKS

Willard L. Morrison, Lake Forest, Ill., assignor, by mesne assignments to Constock Liquid Methane Corporation, a corporation of Delaware Filed Aug. 12, 1953, Ser. No. 373,867

6 Claims. (Cl. 154—82)

My invention relates to the manufacture and installation of insulating lining for metal tanks adapted to contain liquefied hydrocarbons and the like at atmospheric pressure and at temperature far below the freezing point of water.

The tanks which I wish to line are gas tight metal tanks having the usual openings, preferably at the top for filling and emptying. The lining I propose to use to insulate the tank is preferably of balsa wood or the like. However, any type of fibrous or porous self-supporting, insulating lining may be used, provided it is such a lining material as will not deteriorate from direct contact with the cold liquid and will protect the metal tank wall from direct contact with the liquid which might reduce the temperature of the wall to a dangerously low point.

I propose to assemble the balsa wood or other insulating material into a plurality of staves which can be assembled inside the tank to provide a continuous unbroken insulating wall between the cold liquid and the metal tank wall.

Balsa wood of commerce usually reaches the market in this country in comparatively small pieces, a few feet in length and but a few inches in width and thickness. The small balsa wood sticks will be assembled or built up into a plurality of large, self-supporting staves or beams, the separate smaller pieces being assembled, glued together and cut to proper dimensions to line the tank.

The tanks which I propose to line are built up by welding or riveting of steel plate and will frequently be many feet in diameter and many feet high. They will be generally cylindrical and normally the axis of the cylinder will be vertical. Such tanks when assembled, usually will have a multiplicity of local dimensional irregularities resulting from the bending and riveting or welding or other forming of the steel plates into the tank wall.

It is proposed to line these tanks with an interior insulating lining preferably, though not necessarily, of balsa wood. The lining will be built up of a multiplicity of separate staves which are glued or otherwise assembled together barrel-wise to form the lining. In a tank fifty or a hundred feet in diameter, many thousands of staves will be required and it is highly desirable that the staves be uniform in size and shape. It has in the past been proposed to shape individual staves to fit the particular contour of the tank where the stave is located. This is obviously an expensive and complicated method because it requires individual control and treatment of the size and shape of each separate stave.

If the tank in which the staves are installed could be a true cylinder, then all the staves or lining elements could be identical but this cannot be done so far as the steel shell is concerned.

I propose to accomplish the same result, however, by first lining the tank with a thin, inner workable lining which may take the form of a layer of balsa wood or other insulating material. The inner lining will be applied to the steel tank so as to make a smooth, continuous contact with the inner wall thereof independent of variations of size and shape, as a result, the inner surface of the lining may be quite irregular.

Then after the outer lining has been installed completely around the tank, it will be bored out to a true cylinder. Thereafter uniform individual staves may be inserted in place in the true cylinder without reference to variation of the inner dimensions of the steel tank wall.

Other objects will appear from time to time throughout the specification and claims.

My invention is illustrated more or less diagrammatically in the accompanying drawings, wherein—

Like parts are indicated by like characters throughout the specification and drawings.

1 is the generally cylindrical steel wall. 2 indicates a riveted overlapping joint. 3 is an irregularity resulting from welding. 4 indicates a flat spot in the tank wall. 5 indicates a multiplicity of relatively thin liner segments cemented to and flexible enough to conform with and fit the inner periphery of the steel tank wall. 6 indicates a multiplicity of irregularities on the inner periphery of the initial lining resulting from the application of generally uniform liner segments to the irregular steel tank wall.

Figure 1:
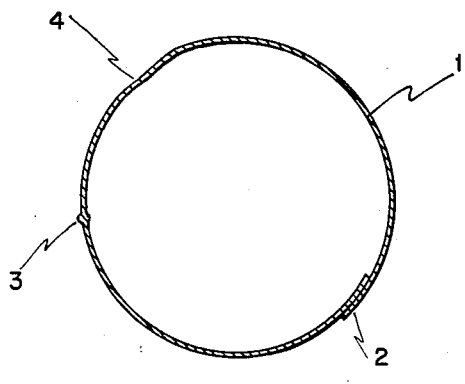
Figure 1 is a plan view of a tank shell showing irregularities exaggerated for clearance of illustration.
Figure 2:
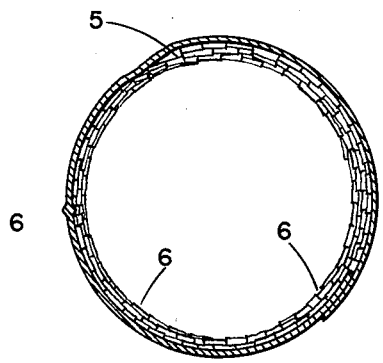
Figure 2 is a plan view showing the initial lining in place, illustrating the interior roughness and irregularity thereof.
Figure 3:
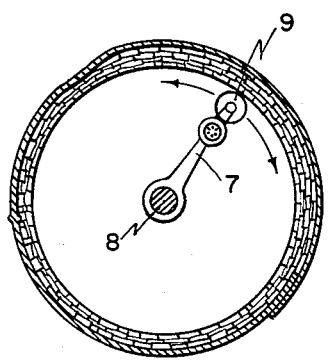
Figure 3 is a plan view similar to Figure 2 showing the initial lining bored out to a true cylinder.

In Figure 3, the liner segments 5 have been cut away to substantially a true cylinder. Any suitable means might be used and I have illustrated a cutter bar 7 mounted for rotation about the center axis 8 and carrying at its outer end 9 a cutting or grinding head so that as it moves around the tank, the cutting surface of cutting elements define and form a true cylinder.

Figure 4:
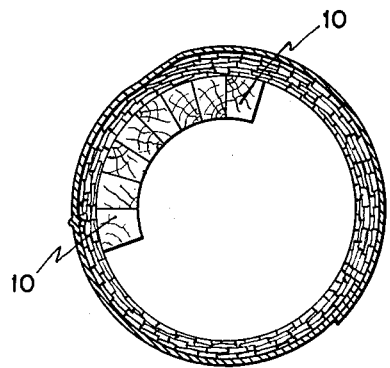
Figure 4 shows the staves uniform in size and shape being installed in the true cylinder defined by the bored out inner lining.

Figure 4 shows the staves 10, all generally identical so far as their thickness and outer contours are concerned, being installed in the true cylinder defined by the initial lining.

The important thing in my solution of the problem is that starting with a steel tank which cannot practically be made absolutely accurate, and intending to line it with a multiplicity of staves to build up a lining which will be continuous and prevent contact of the liquid with the steel wall, I must provide an arrangement such that all the staves may be to all intents and purposes identical in size and shape. If they are not identical each stave would have to be fitted in place, a prohibitively expensive and time consuming operation. Even if it were practical to spend the time and money for individual stave fitting, it could not be done because the staves are inserted in a dried, shrunken condition so that after installation they may absorb moisture, expand and so insure a tight contact with each other and with the periphery of the tank. They must, as a result of this expansion, be so compressed that when the cold liquid contacts them, they again as a result of cold, shrink in size, they will still be under pressure and still provide a continuous lining. If the staves could shrink more than they are compressed, then we would have gaps in the lining through which the liquid could penetrate to the wall of the tank. It takes a long time to build up a lining such as this and therefore unless the staves can be individually placed without time out for fitting them, they will absorb moisture from the air and no longer be shrunk.

I have illustrated the outer lining as being of wood slabs so disposed as to give a flexible outer liner which will conform to the inner contour of the steel tank, a lining which thereafter can be shaped or formed or bored out or cut away to a true cylinder. The particular arrangement of the outer lining is not too important. It might perhaps be of plastic provided that plastic were something which could be cut away and trued up to a cylinder. It might be of small staves, it might be of flat boards, it might be of veneer. The point is that there is an easily machinable, easily shapable outer lining which can be shaped by cutting or any other desired means to a true cylinder.

I claim:

1. The method of installing an insulating lining for a generally cylindrical steel tank having a wall with an irregular inner face which consists in first applying to the said inner face of the tank wall a thin, generally continuous outer lining which on its outer surface conforms generally to and contacts the irregular inner surface of the tank wall, then forming the inner surface of the outer lining to a substantially true cylinder, then erecting a plurality of generally, identically shaped and dimensioned wood staves in side by side engagement against the inner face of the outer lining.

2. The method of installing an insulating lining for a generally cylindrical steel tank having a wall with an irregular inner face which consists in first applying to the said inner face of the tank wall a thin, generally continuous outer lining which on its outer surface conforms generally to and contacts the irregular inner surface of the tank wall, then forming the inner surface of the outer lining to a substantially true cylinder, then erecting a plurality of generally, identically shaped and dimensioned wood staves in side by side engagement against the inner face of the outer lining, drying the staves before installation to shrink them and after installation causing them to resume their natural moisture content and expand with resultant pre-compression of the lining.

3. The method of forming an insulating lining for a cylindrical tank, the contour of the inner surface of which has local irregularities departing from a true cylinder, which consists in attaching to the inner surface of the tank a flexible insulating layer which is so thin and so flexible that it can be forced on its outer surface into conformity with the irregularities of the inner surface of the tank, whereby the inner surface of the lining departs from a true cylinder, then cutting away the inner surface of the lining to a true cylinder, then attaching to such true cylindrical surface an insulating lining of generally uniform thickness whereby the inner surface of the lining is a substantially true cylinder.

4. The method of forming an insulating lining for a cylindrical tank, the contour of the inner surface of which has local irregularities departing from a true cylinder, which consists in attaching to the inner surface of the tank a flexible insulating layer which is so thin and so flexible that it can be forced on its outer surface into conformity with the irregularities of the inner surface of the tank whereby the inner surface of the layer departs from a true cylinder to generally the same extent as does the inner surface of the tank wall, then attaching to the inner surface of the first flexible layer a second flexible layer so thin and flexible that it can be forced on its outer surface into conformity with the irregularities of the inner surface of the first layer whereby the inner surface of the second layer departs from a true cylinder, then cutting away the insulating lining thus formed to a true cylinder, then attaching to such true cylindrical surface a complete insulating lining of generally uniform thickness.

5. The method of forming an insulating lining for a tank of large dimension and capacity for the transportation and storage of a liquefied gas, the contour of the inner surface of the tank being characterized by local irregularities departing from a continuous regular suface, said method consisting of attaching to the inner surface of the tank a thin layer of a flexible insulating material which can be forced on its outer surface into conformity with the irregularities of the inner surface of the tank, cutting away the inner surface of the applied lining to a true regular surface substantially free of local irregularities, and then attaching to said trued surface a relatively thick layer of a relatively inflexible insulating material in the tank.

6. The method of forming an insulating lining for a tank of large dimension and capacity for the transportation and storage of a liquefied gas, the contour of the inner surface of the tank being characterized by local irregularities departing from a continuous regular surface, said method consisting of attaching to the inner surface of the tank a thin layer of a flexible insulating material which can be forced on its outer surface into conformity with the irregularities of the inner surface of the tank, cutting away the inner surface of the applied lining to a true regular surface substantially free of local irregularities, and then mounting preformed, relatively rigid and inflexible staves of large dimension of an insulating material onto the trued inner surface to build up a relatively thick layer of an insulating material.

References Cited in the file of this patent

UNITED STATES PATENTS

| | | |
|---|---|---|
| 484,249 | Schofield | Oct. 11, 1892 |
| 485,810 | Curtis et al. | Nov. 8, 1892 |
| 906,500 | Bayer et al. | Dec. 15, 1908 |
| 1,211,189 | Lerio | Jan. 2, 1917 |
| 1,508,575 | Pitcher et al. | Sept. 16, 1924 |
| 1,920,486 | Smith | Aug. 1, 1933 |
| 2,037,025 | Hoyt | Apr. 14, 1936 |
| 2,105,939 | Cook | Jan. 18, 1938 |
| 2,149,991 | Dodge | Mar. 7, 1939 |
| 2,235,937 | Linberg | Mar. 25, 1941 |
| 2,703,299 | Seymour et al. | Mar. 1, 1955 |

FOREIGN PATENTS

| | | |
|---|---|---|
| 7,009 | Great Britain | 1912 |